C. M. MURCH.
Street-Cars.

No. 147,421.  Patented Feb. 10, 1874.

Attest.
Jas. H. Layman
Walter Allen

Chauncey M. Murch
By Knight Bros.
Att'ys.

UNITED STATES PATENT OFFICE

CHAUNCEY M. MURCH, OF CINCINNATI, OHIO.

IMPROVEMENT IN STREET-CARS.

Specification forming part of Letters Patent No. 147,421, dated February 10, 1874; application filed January 5, 1874.

*To all whom it may concern:*

Be it known that I, CHAUNCEY M. MURCH, of Cincinnati, Hamilton county and State of Ohio, have invented certain new and useful Improvements in Vehicles, of which the following is a specification:

My invention is particularly designed for the class of public cars or vehicles employed or designed to run either upon an ordinary track, or else upon paved streets or turnpike roads; and the first part of my improvements consists in imparting to the body of the vehicle such shape as will render it capable of accommodating in a commodious manner a large number of passengers, without being so wide as to render it bulky, and consequently an impediment to street traffic.

The said car-body is rounded at its forward end, in front of which the driver's platform is attached. From said rounded end the body curves rearward, with bulging sides, which, as they approach the hind wheels, curve inward to form a contracted portion to accommodate said wheels. This contracted portion connects the body proper with the rear platform, and thereby constitutes an aisle, through which the car is entered from said platform, the latter being provided with two pairs of steps, so as to allow ready access to the same. These steps, instead of being arranged parallel with the sides of the vehicle, are oblique thereto, thus allowing two commodious entrances to the car, without unduly increasing the length of the platform.

My improvements also comprise a novel method of connecting the body to the running-gear of the vehicle, the details of said connection being hereinafter fully described.

Figure 1:
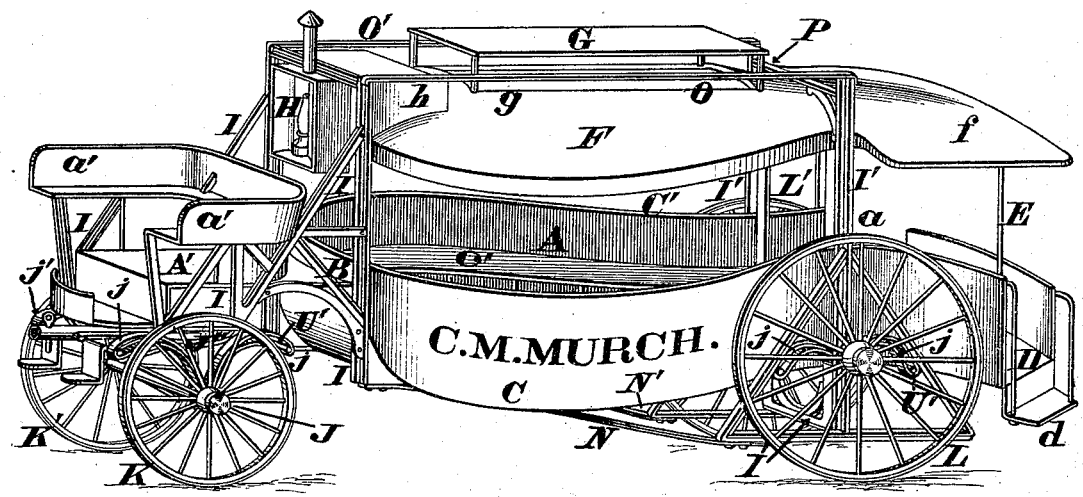
Figure 2:
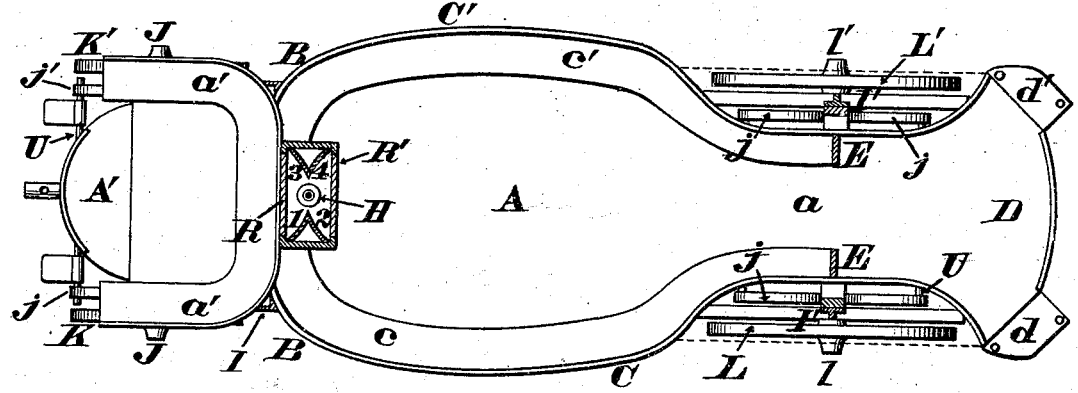
Figure 3:
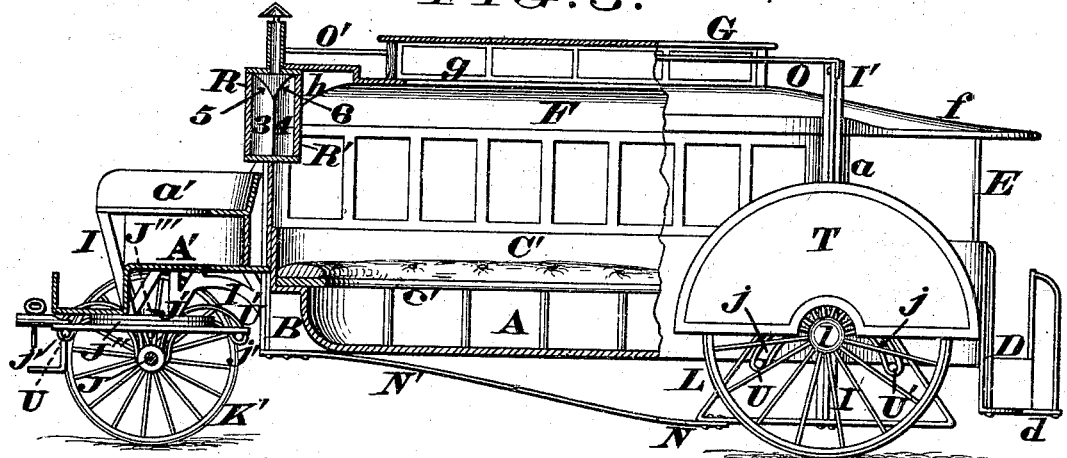

In the accompanying drawings, Figure 1 is a perspective view of a street-car embodying my improvements, the guards or fenders of the rear wheels being removed. Fig. 2 is a plan of the body, the roof or deck thereof being removed, and the wheel-fenders being indicated by dotted lines. Fig. 3 is a partially-sectioned side elevation, the guards being in position.

A represents my preferred form of body proper, or part designed for the accommodation of passengers. The front end of said body is rounded at B, while its sides are bowed outwardly or bulged at C C', and have customary seats at $c$ $c'$, attached to or abutting against them. That portion of the body in rear of the bulge C C' is contracted, as at $a$, so as to provide ways or recesses for the rear wheels L L', and thus prevent their too great protrusion into the street, and also so as to enable them to run on an ordinary street-railroad track, if desired, so as not to obstruct the thoroughfare, the said contracted portion serving, at the same time, as an aisle or passage-way, through which persons may enter the car after alighting upon the platform D. By thus locating the aisle $a$, an undue width of the car-body at this part is entirely obviated, while the bulged portions C C' provide ample room for passengers and baggage in the main body, where such expansion is unobjectionable. The rear platform D is provided with two flights of steps, $d$ $d'$, which may descend as low down toward the ground as desirable. These flights are arranged neither parallel with the sides nor with the rear of the car, as has heretofore been done, but they are placed in an oblique position, as shown in Fig. 2. This oblique arrangement of the steps affords two commodious entrances or gangways without increasing the length of the platform to an objectionable extent, besides which these oblique steps allow passengers to have access to said platform, either at the sides or end of the same, which is an advantage that will render my car especially convenient in crowded streets. Securely attached to the front end of the body is an open framework or bracket, I, that is composed of T angle-iron, whose parts are so arranged as to resist, in the most effective manner, the various strains to which it is subjected, and so as to combine strength with lightness. The bracket I supports and has secured to it an elevated dickey or platform, A', for the use of the driver, and said dickey may be provided with a seat, $a'$, for the accommodation of passengers who may prefer this part of the vehicle. Supported a suitable distance above the body A, upon uprights E, is the roof or deck F of the car, which roof terminates at its rear end in a canopy or screen, $f$, that extends over the platform D. An opening, g, in the roof, protected by a raised portion, G, allows the car to be ventilated in the most thorough manner. The forward end of the roof, at its mid-width, is provided with a recess or niche, h, for the reception of a lamp, H, that will be found more fully described in the sequel. The spaces between the body and the roof may be furnished with customary glass windows.

The car-body is supported upon its running-gear in the following manner: The bracket I is attached to the body A, and may encircle and firmly embrace the entire front part thereof, in the manner shown. This bracket rests upon a suitable bolster or upper member, J', of a customary fifth-wheel, J' J'', whose two members are secured by an ordinary king-bolt, J''', and whose lower member J'' is secured to and supported upon the front axle J by two or more pairs of springs, consisting each one of a steel band blade or plate bent into the represented pear-shaped or pyriform loop j j', whose ends are brought and clamped near together and secured to the front axle in the represented or any suitable manner. The upper side or member j of each loop is comparable to a C-spring, with which the lower portion co-operates as an auxiliary support and counter-brace, resulting in a spring of remarkable elasticity, sensitiveness, and stability, having all the good qualities of the C-spring, with more than double its capacity, endurance, and resilient power. Any suitable projections, U U', from the lower member J'' of the fifth-wheel rest either on the concavities of the lower members of the loops or in sockets attached to any part of the loops removed from their point of attachment to the axle-tree. Additional leaves or blades applied on the under side of either the upper or the lower member of the loop, or both, may be used to any extent desirable. The hind wheels L L' are journaled upon suitable spindles l l', that project at any desired height from the vertical positions of peculiarly formed and braced rectangular open frame or double-bent axle-tree I', which encircles the car-body near its rear end, said body being upheld or suspended within and connected to said axle-tree by springs, which may be precisely similar to those which support the front of the car-body and be similarly attached to the axle-tree, and may be located either at the sides of the body, as shown, or above or below the same.

As the above-mentioned encircling frame I' and looped springs j j' will be made the subjects of separate application for patent, a more specific description of their details of construction is unnecessary in this place. Although preferring the peculiar-looped spring, substantially as herein shown and described, I reserve the option of supporting my car-body on springs of any suitable form.

As the connection of the rear axle to the car-body by means of the looped springs would not, of itself, be sufficient to maintain the encircling axle-tree in its proper vertical position and distance from the front axle, in order to preserve such position without restricting the rocking action of the respective axle, and to guard the springs from the strain of sudden jerks in the direction of draft, I provide four or more strips or blades, N N' O O', preferably of spring-steel, and of which the blades N N' extend rearward from the lower portion of the bracket I, or from the front end of the car-body to the lower part of the encircling axle-tree or axle-tree frame I'. Similarly, the top of the encircling axle-tree is connected to the upper front part of the body, or to the upper part of an encircling frame, I, attached thereto by the overhead braces O O'. A transverse brace, P, unites the upper ends of the two members I' I' of the encircling axle-tree.

The braces N N' O O' operate to protect the supporting-springs against the strain incident to sudden obstructions, and are also otherwise useful, as, for example, any impediment or inequality in the thoroughfare tending to lift or depress either one of the wheels will not seriously disturb the vehicle, because there is sufficient capability of torsion in the said braces to take up or compensate for such disturbance, this limberness of the braces at the same time preserving them from liability to fracture.

By the above-described arrangement, the car is so freely suspended as to yield in every direction, and to thus render it a very easy and pleasant vehicle to ride in; besides, there is none of the disagreeable rattling noise peculiar to ordinary street-cars and omnibuses.

The lamp H, previously alluded to, consists essentially of a frame provided with four concave reflectors, 1, 2, 3, and 4, and two opposite glass sides or windows, R R', of which the window R allows light from the burner H to be emitted in front of the car, between the horses, so as to enable the driver to see clearly the best route to be taken, and to avoid any obstruction or impediment. The other window, R', serves to illuminate the interior of the car. This forward and rearward illumination is accomplished by placing the burner H in the common focus of the four concave reflectors, which latter, in conjunction with top reflectors 5 6, serve to prevent any waste of the light by dispersion of the rays in either a lateral or an upward direction. T represent screens or guards to the rear wheels.

My car may be furnished with any suitable system of brakes.

A summer arrangement of this car may have the seats facing outwardly, leaving a well for baggage in the center.

I claim as new and of my invention—

1. The car or carriage body A, supported at the rear by springs within a suspension frame or axle, connected to the front part of the body by pliable ties N N' O O', substantially as set forth.

2. The body A, constructed with rounded oblong central portion C C', contracted axle $a$, and oblique entrances $d\ d'$, in combination with the encircling frame or axle I', substantially as described.

3. The suspension frame or axle I', constructed and applied substantially as and for the purpose set forth.

4. The front frame I, as described, for the purposes specified.

In testimony of which invention I hereunto set my hand.

CHAUNCEY M. MURCH.

Attest:
GEO. H. KNIGHT,
JAMES H. LAYMAN.